(12) United States Patent
Subramanian et al.

(10) Patent No.: US 10,497,997 B2
(45) Date of Patent: Dec. 3, 2019

(54) ASSEMBLY AND METHOD TO MAINTAIN CLEARANCE TO A THERMAL FIN WITHIN A BATTERY ASSEMBLY

(71) Applicant: FORD GLOBAL TECHNOLOGIES, LLC, Dearborn, MI (US)

(72) Inventors: Rajaram Subramanian, Ann Arbor, MI (US); Steve Droste, Ypsilanti, MI (US); John Jardine, Harrison Township, MI (US); Saravanan Paramasivam, South Lyon, MI (US); Juil Yum, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 769 days.

(21) Appl. No.: 15/069,513

(22) Filed: Mar. 14, 2016

(65) Prior Publication Data

US 2017/0263986 A1  Sep. 14, 2017

(51) Int. Cl.
| | | |
|---|---|---|
| *H01M 10/6551* | (2014.01) | |
| *H01M 10/613* | (2014.01) | |
| *H01M 10/625* | (2014.01) | |
| *H01M 10/6556* | (2014.01) | |
| *H01M 10/6567* | (2014.01) | |
| *H01M 2/14* | (2006.01) | |

(52) U.S. Cl.
CPC ......... *H01M 10/6551* (2015.04); *H01M 2/14* (2013.01); *H01M 10/613* (2015.04); *H01M 10/625* (2015.04); *H01M 10/6556* (2015.04); *H01M 10/6567* (2015.04); *H01M 2220/20* (2013.01)

(58) Field of Classification Search
CPC .......... H01M 10/6551; H01M 10/613; H01M 10/625; H01M 10/6556; H01M 10/6567; H01M 2/14; H01M 2220/20
See application file for complete search history.

(56) References Cited

U.S. PATENT DOCUMENTS

| | | | |
|---|---|---|---|
| 8,564,955 B2 | 10/2013 | Schmidt et al. | |
| 2010/0104935 A1 | 4/2010 | Hermann et al. | |
| 2013/0288098 A1 | 10/2013 | Hamlett | |
| 2015/0017504 A1* | 1/2015 | Isshiki | B60L 3/0046 |
| | | | 429/120 |
| 2015/0249238 A1* | 9/2015 | Andre | B60K 1/04 |
| | | | 429/99 |
| 2015/0276798 A1 | 10/2015 | Song et al. | |
| 2015/0280184 A1 | 10/2015 | Utley et al. | |
| 2016/0036019 A1 | 2/2016 | Gunna et al. | |
| 2017/0200995 A1* | 7/2017 | Phlegm | H01M 2/1077 |

* cited by examiner

*Primary Examiner* — Stephen J Yanchuk
(74) *Attorney, Agent, or Firm* — David Kelley; Carlson, Gaskey & Olds, P.C.

(57) ABSTRACT

An exemplary battery assembly includes, among other things, a thermal fin, a frame holding the thermal fin, and a stand-off of the frame configured to limit relative movement of the thermal fin toward a thermal exchange plate. An exemplary thermal fin positioning method, includes limiting relative movement of a thermal fin toward a thermal exchange plate using a stand-off disposed upon a battery cell assembly frame.

20 Claims, 3 Drawing Sheets

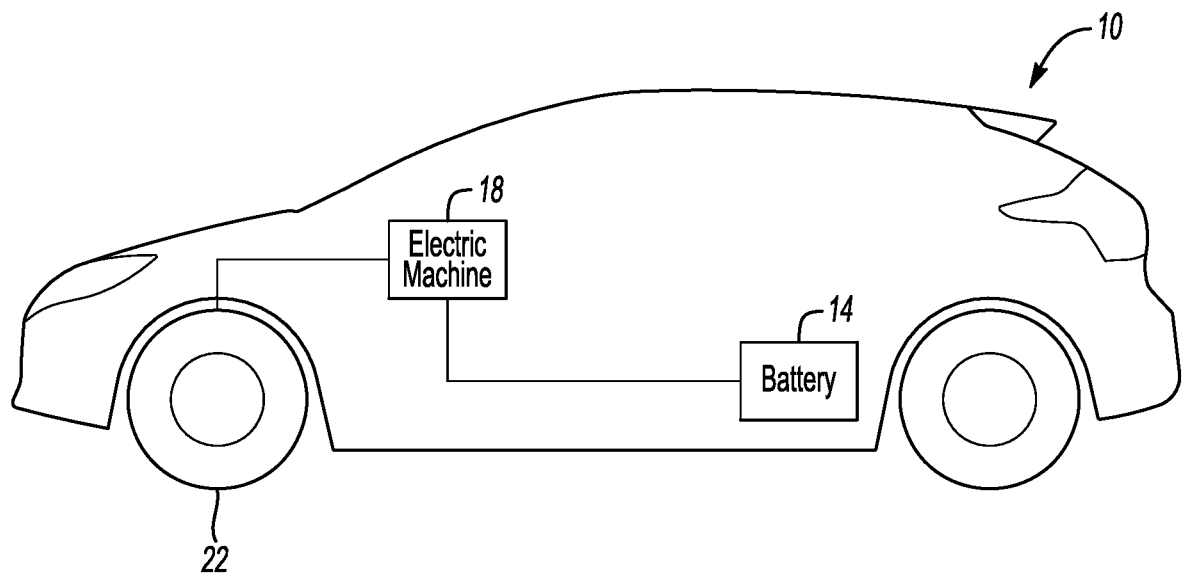
_Fig-1_
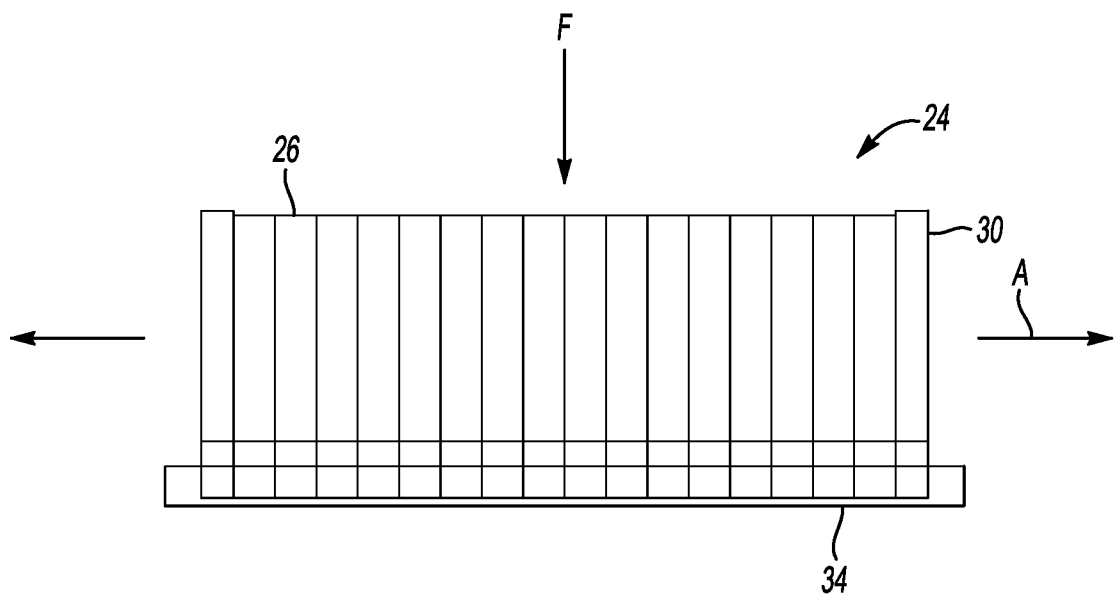
_Fig-2_

ASSEMBLY AND METHOD TO MAINTAIN CLEARANCE TO A THERMAL FIN WITHIN A BATTERY ASSEMBLY

TECHNICAL FIELD

This disclosure relates generally to maintaining clearances within a battery pack. The clearances facilitate thermal energy transfer between a thermal fin and a thermal exchange plate.

BACKGROUND

Electrified vehicles differ from conventional motor vehicles because electrified vehicles are selectively driven using one or more electric machines powered by a battery pack. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Battery packs of electrified vehicles typically include a plurality of arrays each having individual battery cells that are periodically recharged to replenish the energy necessary to power the electric machines. Battery cells can heat up during charging and discharging, and during other stages of operation. Operating the battery cells at certain temperatures can improve the capacity and the life of the battery cells.

SUMMARY

A battery assembly according to an exemplary aspect of the present disclosure includes, among other things, a thermal fin, a frame holding the thermal fin, and a stand-off of the frame configured to limit relative movement of the thermal fin toward a thermal exchange plate.

In a further non-limiting embodiment of the foregoing assembly, the thermal fin is in-molded together with the frame.

In a further non-limiting embodiment of any of the foregoing assemblies, the thermal fin extends a first distance away from a surface of the frame toward the thermal exchange plate, and the stand-off extends a second distance toward the thermal exchange plate. The second is distance greater than the first distance. The surface faces the heat exchange plate.

In a further non-limiting embodiment of any of the foregoing assemblies, the assembly comprises a plate portion of the thermal fin configured to be positioned between axially adjacent electrodes within a battery pack array, and further comprises a first foot and a second foot of the thermal fin. The first foot and second foot both extend axially from the plate portion.

In a further non-limiting embodiment of any of the foregoing assemblies, the first fin is positioned between a first pair of stand-offs, and the second fin is positioned between a second pair of the stand-offs.

In a further non-limiting embodiment of any of the foregoing assemblies, the first foot is laterally spaced from the second foot.

In a further non-limiting embodiment of any of the foregoing assemblies, the assembly includes a thermal interface material between the thermal fin and the thermal exchange plate.

In a further non-limiting embodiment of any of the foregoing assemblies, the thermal interface material is a liquid.

In a further non-limiting embodiment of any of the foregoing assemblies, the thermal interface material is a non-liquid.

In a further non-limiting embodiment of any of the foregoing assemblies, the thermal interface material directly contacts the stand-off and the thermal fin.

A thermal fin positioning method according to an exemplary aspect of the present disclosure includes, among other things, limiting relative movement of a thermal fin toward a thermal exchange plate using a stand-off disposed upon a battery cell assembly frame.

In a further non-limiting embodiment of the foregoing method, the stand-off is integral with the battery frame.

In a further non-limiting embodiment of any of the foregoing methods, the method includes in-molding the thermal fin with the frame.

In a further non-limiting embodiment of any of the foregoing methods, the method includes contacting a thermal interface material with the thermal fin.

In a further non-limiting embodiment of any of the foregoing methods, the thermal interface material is a liquid.

In a further non-limiting embodiment of any of the foregoing methods, the thermal interface material is a non-liquid.

In a further non-limiting embodiment of any of the foregoing methods, the method includes contacting the stand-off against the thermal exchange plate to limit movement of the thermal fin toward the thermal exchange plate.

In a further non-limiting embodiment of any of the foregoing methods, the thermal fin and the stand-off extend from the frame in the same direction.

BRIEF DESCRIPTION OF THE FIGURES

The various features and advantages of the disclosed examples will become apparent to those skilled in the art from the detailed description. The figures that accompany the detailed description can be briefly described as follows:

FIG. 1 shows a side view of an example electric vehicle incorporating a battery pack.

FIG. 2 shows a side view of an array from the battery pack of FIG. 1.

DETAILED DESCRIPTION

Figure 3:
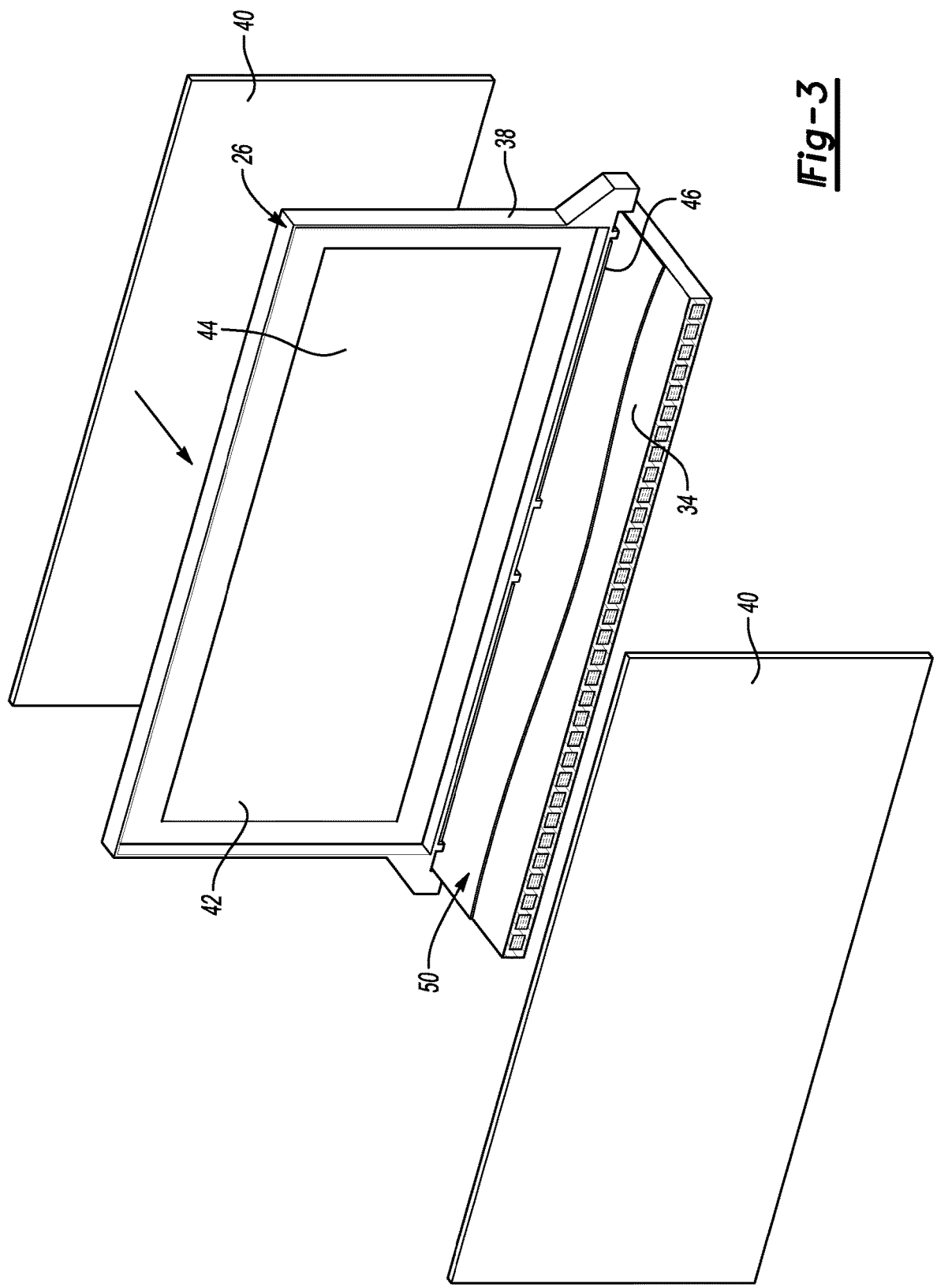
FIG. 3 shows a partially exploded and partially sectioned view of a battery cell from the array of FIG. 2 positioned adjacent a thermal exchange plate.

This disclosure relates generally to maintaining clearances within a battery pack. In particular, the disclosure is directed toward a stand-off that maintains a clearance between a thermal fin and a thermal exchange plate. Positioning the thermal fin against, or too close to, the thermal exchange plate can inhibit circulation of a thermal interface material (TIM) that is a liquid. Positioning the thermal fin against, or too close to, the thermal exchange plate can compress a TIM that is a non-liquid.

Referring to FIG. 1, an example electrified vehicle 10 includes a battery 14, an electric machine 18, and a pair of vehicle drive wheels 22. The electric machine 18 can receive electric power from the battery 14. The electric machine 18 converts the electric power to torque that drives the wheels 22. The illustrated battery 14 comprises a relatively high voltage traction battery in some embodiments.

The exemplary vehicle 10 is an all-electric vehicle. In other examples, the electrified vehicle 10 is a hybrid electric vehicle, which can selectively drive the wheels 22 with torque provided by an internal combustion engine instead of, or in addition to, the electric machine 18.

Referring now to FIG. 2 with continuing reference to FIG. 1, an array 24 of the battery 14 includes a plurality of individual battery cell assemblies 26 disposed along an axis A and sandwiched axially between endplates 30. The battery 14 can include the array 24 and several other arrays. The array 24 is considered a module or stack in some examples.

The battery cell assemblies 26 and endplates 30 are disposed adjacent to a thermal exchange plate 34. The thermal exchange plate 34 is used to control heat levels within the battery cell assemblies 26.

Figure 4:
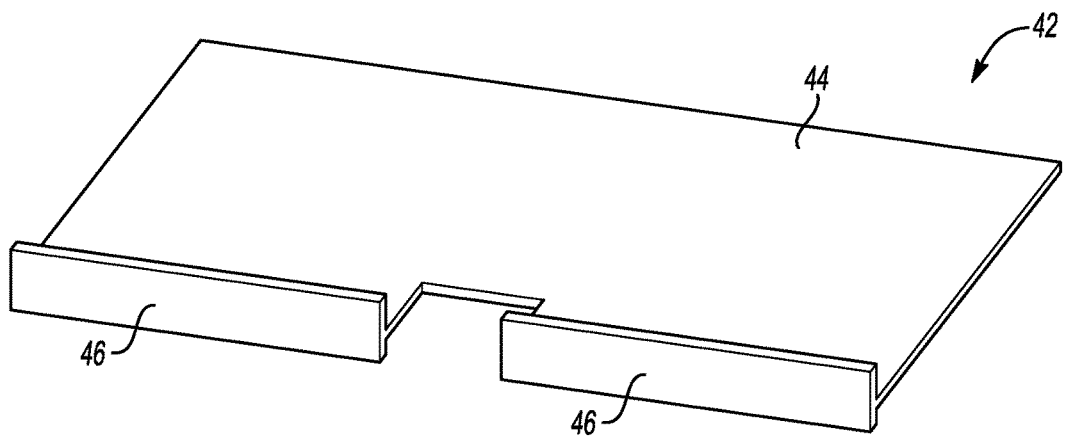
FIG. 4 shows a perspective view of a thermal fin from the battery cell of FIG. 3.
Figure 5:
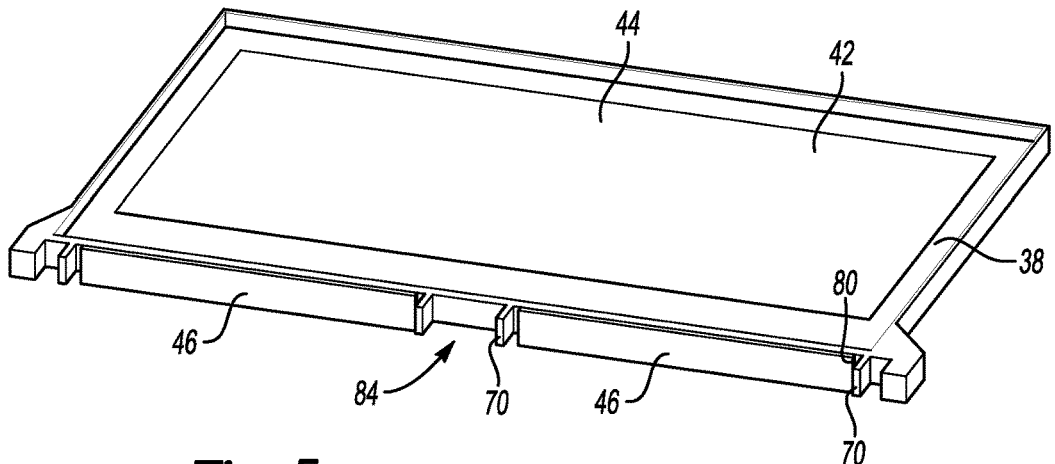
FIG. 5 shows a perspective view of a frame and thermal fin of the battery cells of FIG. 3.

Referring now to FIGS. 3-5 with continuing reference to FIG. 2, a battery cell assembly 26 generally includes a frame structure 38. Within the battery 14, axially adjacent frame structures are compressed axially against electrode structures 40. The frame structure 38 helps to hold the electrode structures 40.

The example frame structure 38 also holds a thermal fin 42 that extends from the frame structure 38 toward the thermal exchange plate 34. The thermal fin 42 includes a plate portion 44 and at least one foot 46 extending axially from the plate portion 44. The thermal fin 42 is typically a metallic material, such as aluminum. The frame structure 38, in contrast to the thermal fin 42, can be a polymer material. In this example, the thermal fin 46 is in-molded with the frame structure 38.

Within the battery 14, the plate portion 44 takes on thermal energy from the electrode structures 40. The thermal energy moves from the plate portion 44 to the at least one foot 46. Thermal energy then passes from the at least one foot 46, through a layer of a TIM 50 to the thermal exchange plate 34. A temperature management fluid 54 is circulated through channels 58 within the thermal exchange plate 34. The temperature management fluid 54 carries thermal energy from the thermal exchange plate 34 away from the thermal exchange plate 34 to cool the battery 14.

In this example, the TIM 50 is a liquid TIM. In another example, the TIM is a non-liquid TIM. The TIM 50 facilitates transfer of thermal energy between the thermal fin 42 and the thermal exchange plate 34.

The example TIM 50 is liquid. Movement and flow of the TIM 50 is compromised if the thermal fin 42 contacts, or is too close to, the thermal exchange plate 34. The thermal energy transfer between feet 46 and the thermal exchange plate 34 can be inhibited if the movement and flow of the liquid TIM 50 is compromised.

In examples where the TIM 50 is a non-liquid TIM, compression of the non-liquid TIM due to the thermal fin 42 being urged toward the thermal exchange plate 34 could compress the TIM 50 and inhibit thermal energy transfer.

The thermal fin 42 can directly contact the TIM 50 whether the TIM 50 is liquid or non-liquid. Direct contact can facilitate thermal exchange.

A person having skill in this art and the benefit of this disclosure would understand liquid TIMs and non-liquid TIMs. Example liquid TIMs can include substantially any liquid utilized to exchange thermal energy, such as BERGQUIST® liquid TIMs. Example non-liquid TIMs can include substantially any non liquid utilized to exchange thermal energy, such as silicon based sheet TIMs manufactured by SHIN-ETSU®.

Figure 6:
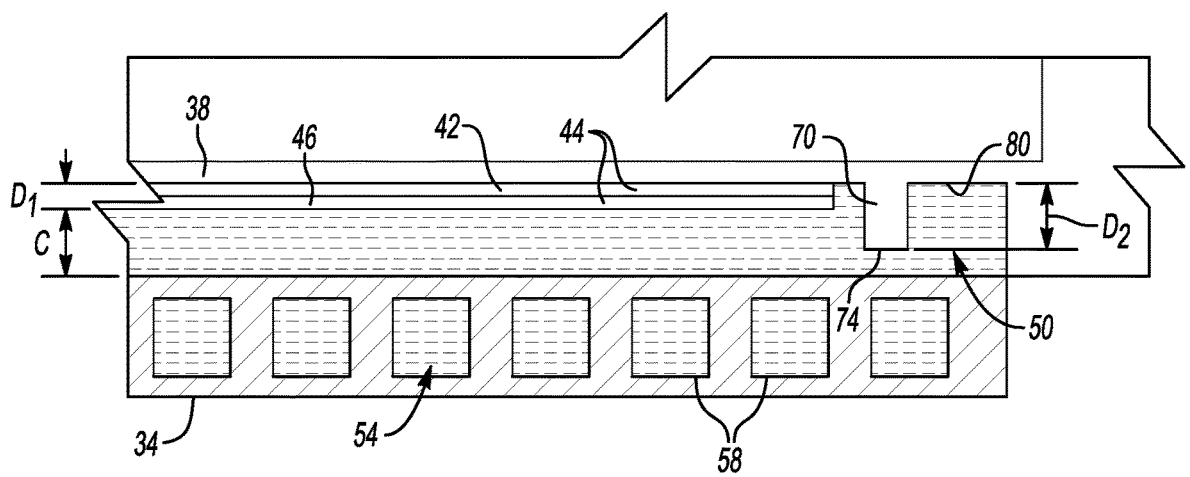
FIG. 6 shows a close-up front view of the portion of the array of FIG. 3 showing an example stand-off.

Referring now to FIG. 6 with continuing reference to FIGS. 2-5, a force F can cause the at least one foot 46 of the thermal fin 42 to be urged toward the thermal exchange plate 34. The forces F can be gravitational forces that cause some of the battery cell assemblies 26 to sag toward the thermal exchange plate 34. The sagging reduces a clearance C between the feet 46 of the thermal fin 42 and the thermal exchange plate 34. Binding and compressing the battery cell assemblies 26 within the array 24 could also reduce the clearance C. Assembly tolerances can also cause the clearance C to be reduced in some arrays 24 or in some areas of the array 24. Substantially non-uniform pressures or excessive loads from hold down brackets associated with the array 24 could also reduce the clearance C in some areas of the array 24.

The example frame structure 38 incorporates stand-offs 70, or ribs, to prevent the clearance C from being eliminated or reduced below a threshold level. Without the stand-offs 70, the forces, assembly tolerances, or both, could result in the feet 46 of the thermal fin 42 coming undesirably close, or even contacting, the thermal exchange plate 34. In this example, a tip portion 74 of the stand-off 70 contacts the thermal exchange plate 34 to prevent the thermal fin 42 from moving too close to the thermal exchange plate 34.

The stand-offs 70 can be can be molded together with the remaining portions of the frame structure 38 such that the stand-offs 70 are integral portions of the frame structure 38. The stand-offs 70 could be a separate component that is secured to other portions of the frame structure 38 with a secondary operation after molding the frame structure 38.

In this example, the stand-offs 70 are not incorporated into the thermal fin 42 at least because the thermal fin 42 is a metallic material. The stand-offs 70 can directly contact the TIM 50.

A surface 80 of the frame structure 38 faces the thermal exchange plate 34. At least a portion of the feet 46 is positioned between the surface 80 and the thermal exchange plate 34. The thermal fin 42 extends a first distance $D_1$ from the surface 80. The stand-off 70 extends from surface 80 a second distance $D_2$, which is greater than the first distance $D_1$. Because the stand-off 70 extends closer to the thermal exchange plate 34 than the thermal fin 42, the stand-off 70 can contact the thermal exchange plate 34 to prevent the feet 46 from moving too close to the thermal exchange plate 34.

The example thermal fin 42 includes two feet 46. The example frame structure 38 includes four stand-offs 70. One of the stand-offs 70 is positioned at the longitudinal ends of each foot 46.

A space 84 between the feet 46 and the laterally inner stand-offs 70 can accommodate a strap (not shown) used to help bind the battery cell assemblies 26 axially between the endplates 30. The strap is typically a metallic material. The stand-offs 70, and particularly the laterally inner stand-offs 70, prevent the strap from coming undesirably close to, or into contact with, the thermal exchange plate 34. The perimeter of the frame structure 38 could instead, or additionally, include structures used to hold the array 24 together.

Features of some of the disclosed embodiments include maintaining clearances within an array to help ensure that a liquid TIM is free to move in areas requiring thermal exchange. In some examples, the clearance ensures that liquid TIM will be positioned between a thermal fin and a thermal exchange plate. The clearance can help to avoid sloshing and buildup of a liquid TIM.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery assembly, comprising:
a first electrode;
a second electrode that is axially adjacent to the first electrode;
a thermal fin having a plate portion, at least one first foot, and at least one second foot, the plate portion configured to be positioned between the first and second electrodes within a battery pack array, the at least one first foot and the least one second foot extending axially away from the plate portion;
a frame holding the thermal fin; and
a plurality of stand-offs of the frame, each stand-off within the plurality of stand-offs configured to limit relative movement of the thermal fin toward a thermal exchange plate, wherein at least one of the stand-offs within the plurality of stand-offs is positioned between the at least one first foot and the at least one second foot of the thermal fin.

2. The battery assembly of claim 1, wherein the thermal fin is in-molded together with the frame.

3. The battery assembly of claim 1, wherein the thermal fin extends a first distance away from a surface of the frame toward the thermal exchange plate, and each stand-off within the plurality of stand-offs extends a second distance toward the thermal exchange plate, the second distance greater than the first distance, wherein the surface faces the thermal exchange plate.

4. The battery assembly of claim 1, wherein the at least one first foot is laterally spaced from the at least one second foot.

5. The battery assembly of claim 1, comprising a thermal interface material between the thermal fin and the thermal exchange plate.

6. The battery assembly of claim 5, wherein the thermal interface material is a liquid.

7. The battery assembly of claim 5, wherein the thermal interface material is a non-liquid.

8. The battery assembly of claim 5, wherein the thermal interface material directly contacts the plurality of stand-offs and the thermal fin.

9. The battery assembly of claim 1, wherein the at least one first foot is positioned between a first pair of stand-offs within the plurality of stand-offs, and the at least one second foot is positioned between a second pair of stand-offs within the plurality of stand-offs.

10. The battery assembly of claim 9, wherein the first pair of stand-offs includes a laterally inner first stand-off and a laterally outer first stand-off, wherein the second pair of stand-offs includes a laterally inner second stand-off and a laterally outer second stand-off.

11. The battery assembly of claim 10, wherein the frame includes a space between the laterally inner first stand-off and the laterally inner second stand-off, the space configured to accommodate a strap that binds a battery cell assembly having the frame and the insert axially between a first endplate and a second endplate.

12. The battery assembly of claim 1, wherein the at least one first foot extends axially from the plate portion in a first direction and extends axially from the plate portion in a second direction opposite the first direction, wherein the at least one second foot extends axially from the plate portion in a first direction and extends axially from the plate portion in a second direction opposite the first direction.

13. A battery assembly, comprising:
a first electrode;
a second electrode that is axially adjacent to the first electrode;
a thermal exchange plate;
a frame having at least one stand-off;
a thermal fin held by the frame, the thermal fin having a plate portion, at least one first foot, and at least one second foot, the plate portion configured to be positioned between the first and second electrodes within a battery pack array, the at least one first foot and the least one second foot extending axially away from the plate portion; and
a thermal interface material including a portion between the thermal exchange plate and the at least one first foot, and another portion between the thermal exchange plate at the at least one second foot,
the at least one first foot on a first lateral side of the at least one stand-off, and the at least one second foot on an opposite, second lateral side of the at least one stand-off,
the at least one stand-off configured to limit relative movement of the thermal fin toward the thermal exchange plate.

14. The battery assembly of claim 13, wherein the at least one stand-off comprises at least two stand-offs.

15. The battery assembly of claim 14, wherein the at least two stand-offs are spaced apart to provide a space configured to accommodate a strap that binds a battery cell assembly having the frame and the insert axially between a first endplate and a second endplate.

16. The battery assembly of claim 13, wherein the thermal fin extends a first distance away from a surface of the frame toward the thermal exchange plate, and the at least one stand-off extends a second distance toward the thermal exchange plate, the second distance greater than the first distance, wherein the surface faces the thermal exchange plate, wherein the thermal interface material directly contacts the at least one stand-off and the thermal fin.

17. The battery assembly of claim 16, wherein the thermal interface material is a non-liquid.

18. A battery assembly, comprising:
a first electrode;
a second electrode that is axially adjacent to the first electrode;
a thermal exchange plate;
a thermal fin having a plate portion, at least one first foot, and at least one second foot, the plate portion configured to be positioned between the first and second electrodes within a battery pack array, the at least one first foot and the least one second foot extending axially away from the plate portion, the at least one first foot laterally spaced a distance from the at least one second foot;
a thermal interface material between the thermal fin and the thermal exchange plate, the thermal interface material directly contacting the at least one first foot and the at least one second foot of the thermal fin;
a frame holding the thermal fin;
at least one laterally inner stand-off of the frame, the at least one laterally inner stand-off configured to limit relative movement of the thermal fin toward the thermal exchange plate, the at least one laterally inner stand-off positioned between the at least one first foot and the at least one second foot of the thermal fin; and at least one laterally outer stand-off of the frame, the at least one laterally inner stand-off configured to limit relative movement of the thermal fin toward the thermal exchange plate, the thermal interface material directly contacting the at least one laterally inner stand-off and the at least one laterally outer stand-off.

19. The battery assembly of claim 18, wherein the at least one laterally inner stand-off includes at least two laterally inner stand-offs, and the at least one laterally outer stand-off includes at least two laterally outer stand-offs, wherein the first foot is positioned between a first one of the laterally inner stand-offs and a first one of the laterally outer stand-offs, wherein the second foot is positioned between a second one of the laterally inner stand-offs and a second one of the laterally outer stand-offs, wherein the frame includes a space between the first and second laterally inner stand-offs.

20. The battery assembly of claim 19, wherein the space is configured to accommodate a strap that binds a battery cell assembly having the frame and the insert axially between a first endplate and a second endplate, wherein the at least one first foot extends axially from the plate portion in a first direction and extends axially from the plate portion in a second direction opposite the first direction, wherein the at least one second foot extends axially from the plate portion in a first direction and extends axially from the plate portion in a second direction opposite the first direction.

* * * * *